(12) United States Patent
Nakamura et al.

(10) Patent No.: US 11,131,850 B2
(45) Date of Patent: Sep. 28, 2021

(54) DISPLAY APPARATUS AND EQUIPMENT

(71) Applicant: Ricoh Company, Ltd., Tokyo (JP)

(72) Inventors: Kento Nakamura, Kanagawa (JP);
Makoto Hirakawa, Kanagawa (JP);
Hiromichi Atsuumi, Kanagawa (JP);
Naoki Miyatake, Kanagawa (JP); Yuki Hayashi, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 177 days.

(21) Appl. No.: 16/484,161

(22) PCT Filed: Feb. 2, 2018

(86) PCT No.: PCT/JP2018/003699
§ 371 (c)(1),
(2) Date: Aug. 7, 2019

(87) PCT Pub. No.: WO2018/155138
PCT Pub. Date: Aug. 30, 2018

(65) Prior Publication Data
US 2019/0361232 A1    Nov. 28, 2019

(30) Foreign Application Priority Data

Feb. 21, 2017    (JP) .............................. JP2017-029931
Dec. 6, 2017    (JP) .............................. JP2017-234154

(51) Int. Cl.
*G03B 21/14*    (2006.01)
*G02B 27/01*    (2006.01)
*G03B 21/28*    (2006.01)

(52) U.S. Cl.
CPC ..... *G02B 27/0101* (2013.01); *G02B 27/0149* (2013.01); *G03B 21/145* (2013.01);
(Continued)

(58) Field of Classification Search
CPC .. G03B 21/28; G03B 21/145; G03B 21/2013; G03B 21/2033; G03B 21/2053;
(Continued)

(56) References Cited

U.S. PATENT DOCUMENTS

2004/0095651 A1*   5/2004   Aoki .................. G02B 27/0149
                                                         359/630
2005/0024490 A1*   2/2005   Harada .............. G02B 27/0149
                                                         348/115

(Continued)

FOREIGN PATENT DOCUMENTS

EP    2 945 001 A1    11/2015
EP    3 088 935 A1    11/2016

(Continued)

OTHER PUBLICATIONS

International Search Report and Written Opinion dated May 7, 2018 in PCT/JP2018/003699 filed Feb. 2, 2018.

*Primary Examiner* — Sultan Chowdhury
(74) *Attorney, Agent, or Firm* — Xsensus LLP

(57) ABSTRACT

A display apparatus includes a screen configured to form an intermediate image by being irradiated with light, a front windshield configured to display a virtual image by being irradiated with light forming the intermediated image, a reflection member configured to reflect light going out from the screen to the front windshield, and a rotation shaft configured to rotate the reflection member. The rotation shaft is tilted with respect to a pitch axis. The reflection member has notches formed thereon.

17 Claims, 8 Drawing Sheets

(52) U.S. Cl.
CPC ...... *G03B 21/28* (2013.01); *G02B 2027/0145* (2013.01); *G02B 2027/0159* (2013.01)

(58) Field of Classification Search
CPC ............. G03B 21/2066; H04N 9/3105; H04N 9/3155; H04N 9/3161; H04N 9/3164; H04N 9/3173; G02B 27/01; G02B 27/104; G02B 27/149; G02B 27/0101; G02B 27/0172; G02B 2027/0107; G02B 2027/0112; G02B 2027/0145; G02B 2027/0159
See application file for complete search history.

(56) References Cited

U.S. PATENT DOCUMENTS

| | | | |
|---|---|---|---|
| 2008/0048936 A1* | 2/2008 | Powell | G02B 27/104 345/55 |
| 2014/0177022 A1 | 6/2014 | Saisho et al. | |
| 2014/0293435 A1* | 10/2014 | Kobayashi | G02B 27/0101 359/631 |
| 2015/0205126 A1* | 7/2015 | Schowengerdt | G02B 3/0006 345/633 |
| 2015/0219803 A1* | 8/2015 | Inamoto | G02B 3/0043 359/627 |
| 2015/0277115 A1 | 10/2015 | Inamoto et al. | |
| 2015/0370069 A1 | 12/2015 | Saisho et al. | |
| 2016/0320615 A1 | 11/2016 | Nakamura et al. | |
| 2016/0320616 A1 | 11/2016 | Ichii | |
| 2016/0334637 A1 | 11/2016 | Saisho et al. | |
| 2017/0154558 A1 | 6/2017 | Atsuumi et al. | |
| 2017/0269362 A1 | 9/2017 | Yamasaki | |
| 2017/0315353 A1 | 11/2017 | Saisho et al. | |
| 2018/0164585 A1* | 6/2018 | Nambara | G02B 27/0101 |

FOREIGN PATENT DOCUMENTS

| | | |
|---|---|---|
| JP | 2012-163630 | 8/2012 |
| JP | 2015-232692 | 12/2015 |
| WO | 2016/027531 | 2/2016 |
| WO | 2016/189361 | 12/2016 |

\* cited by examiner

[Fig. 1]
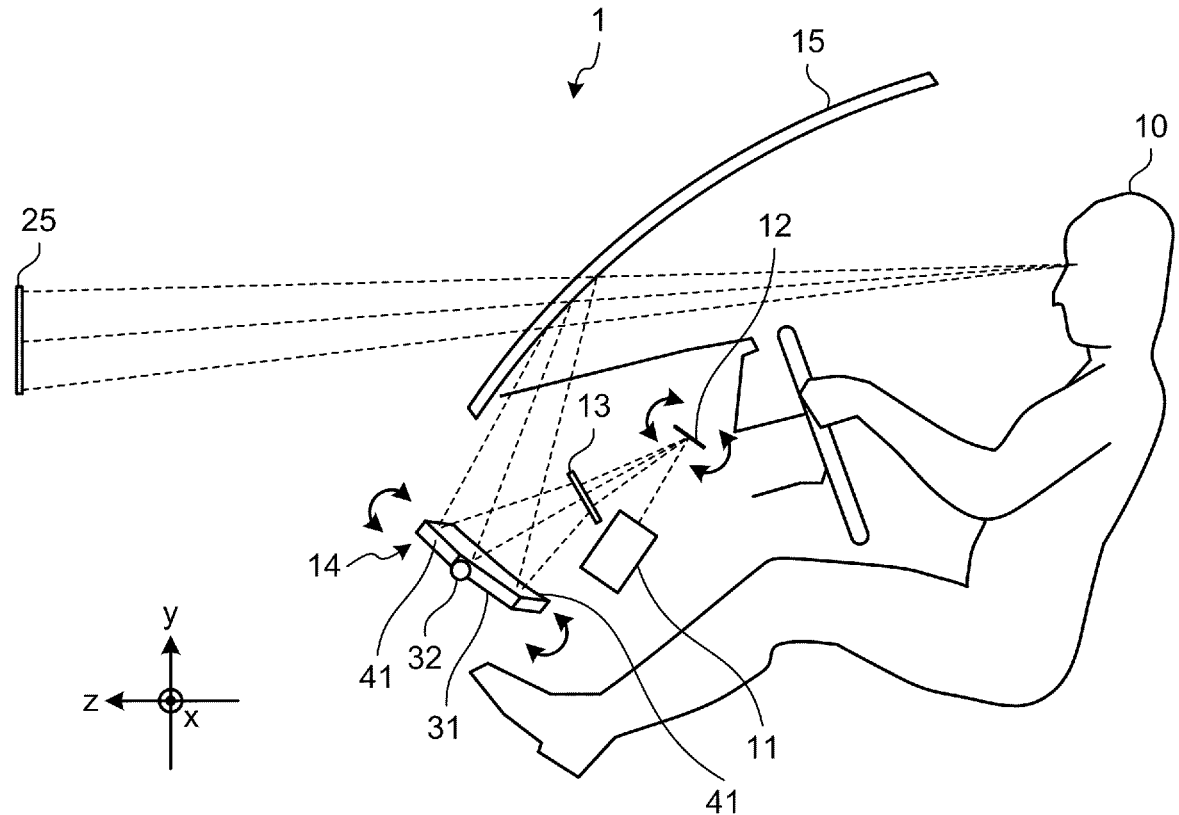
[Fig. 2]
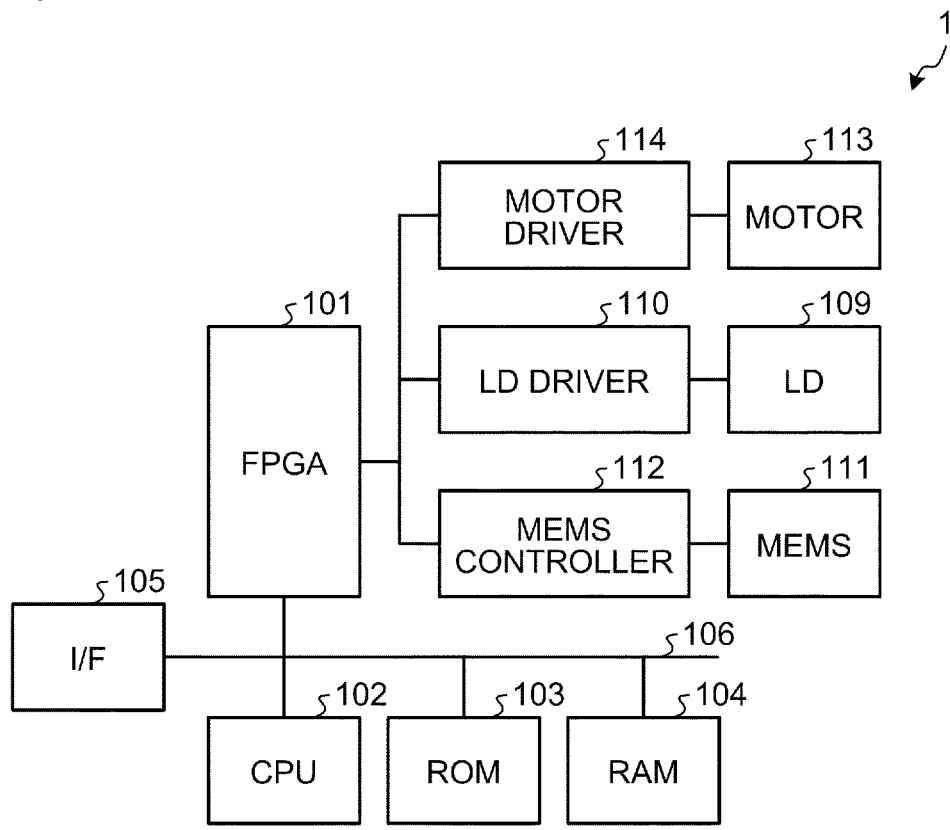

[Fig. 3]
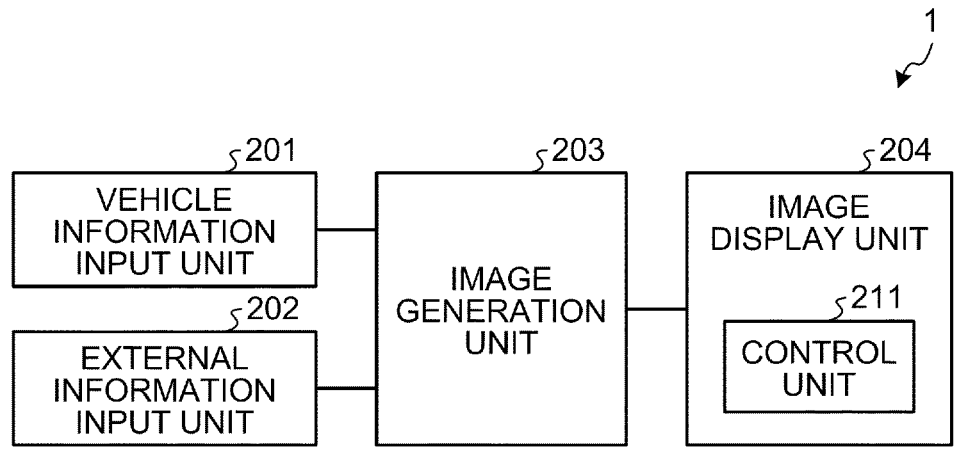
[Fig. 4]
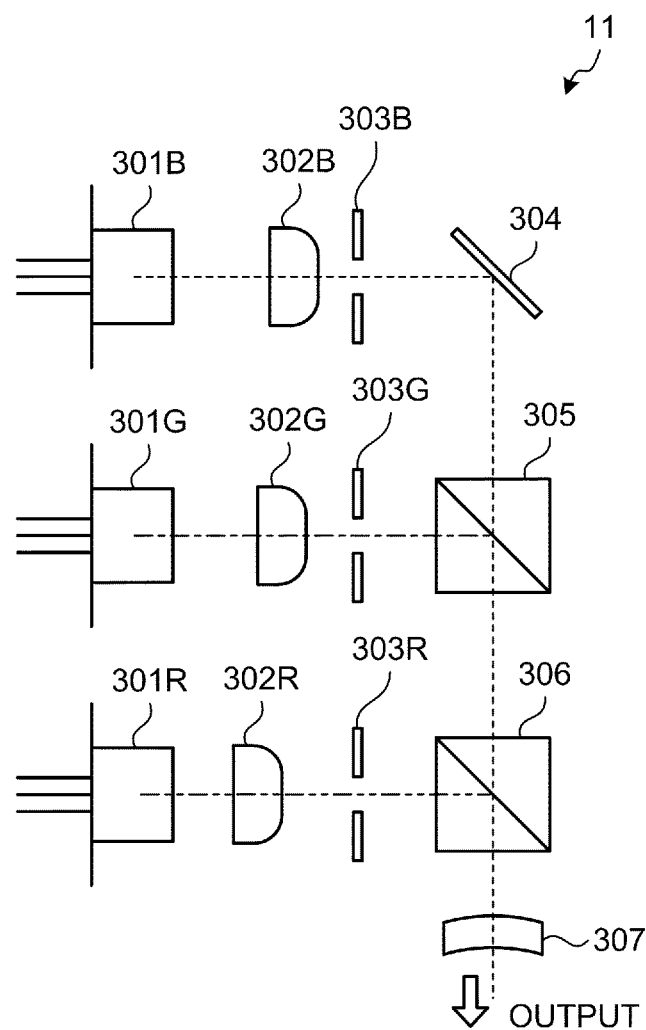

[Fig. 5]
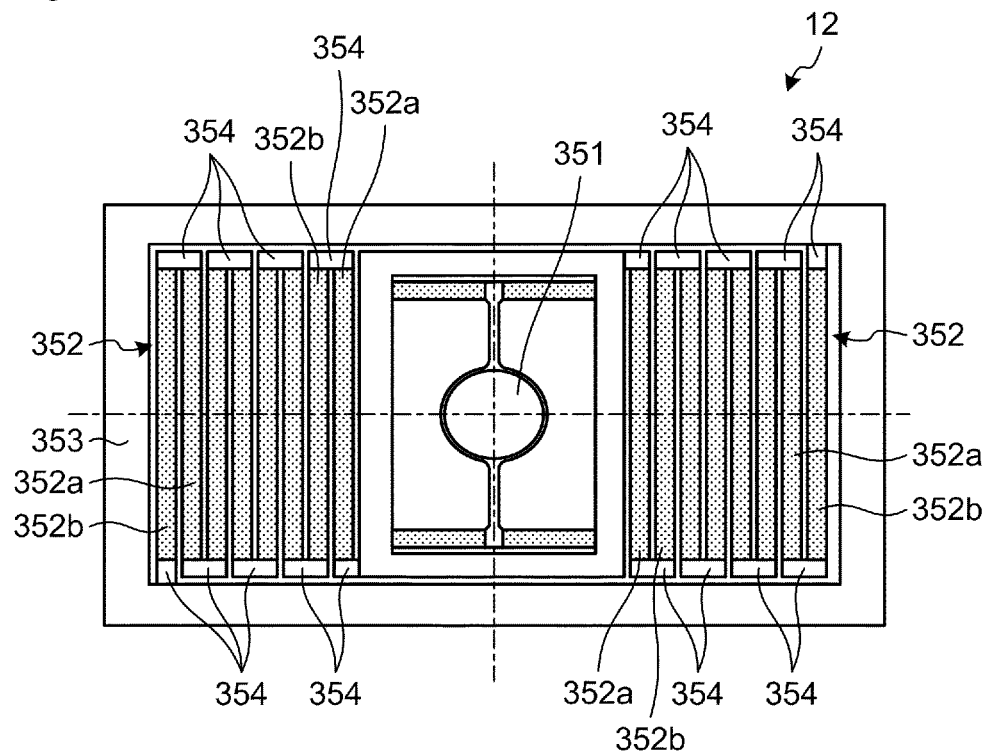
[Fig. 6]
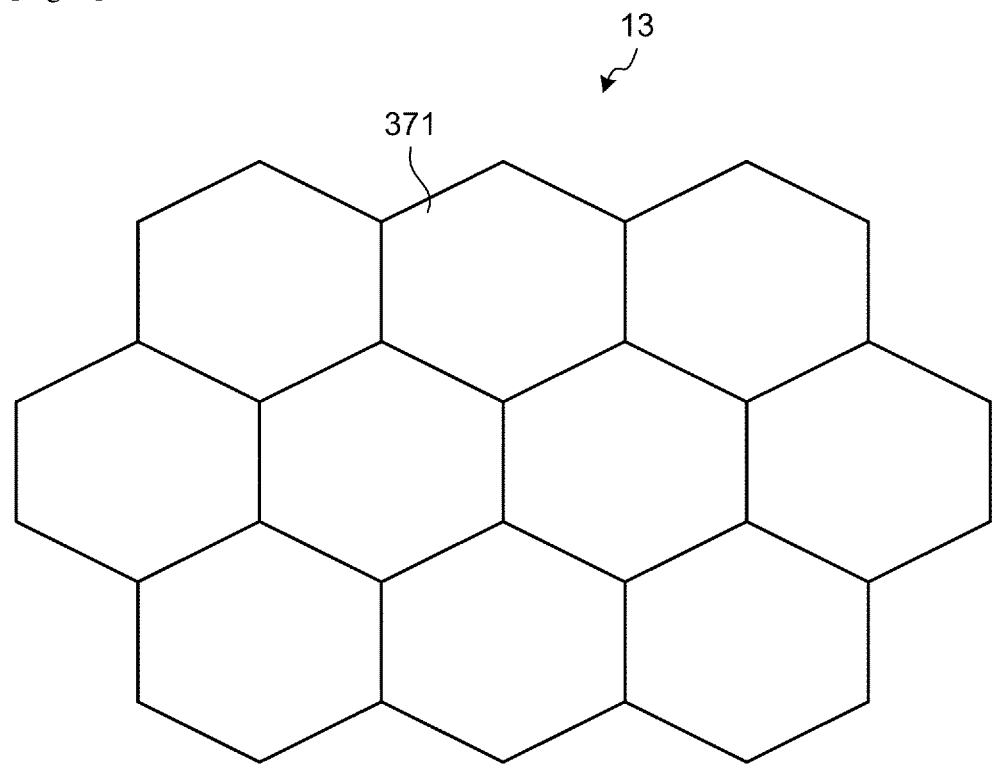

[Fig. 7]
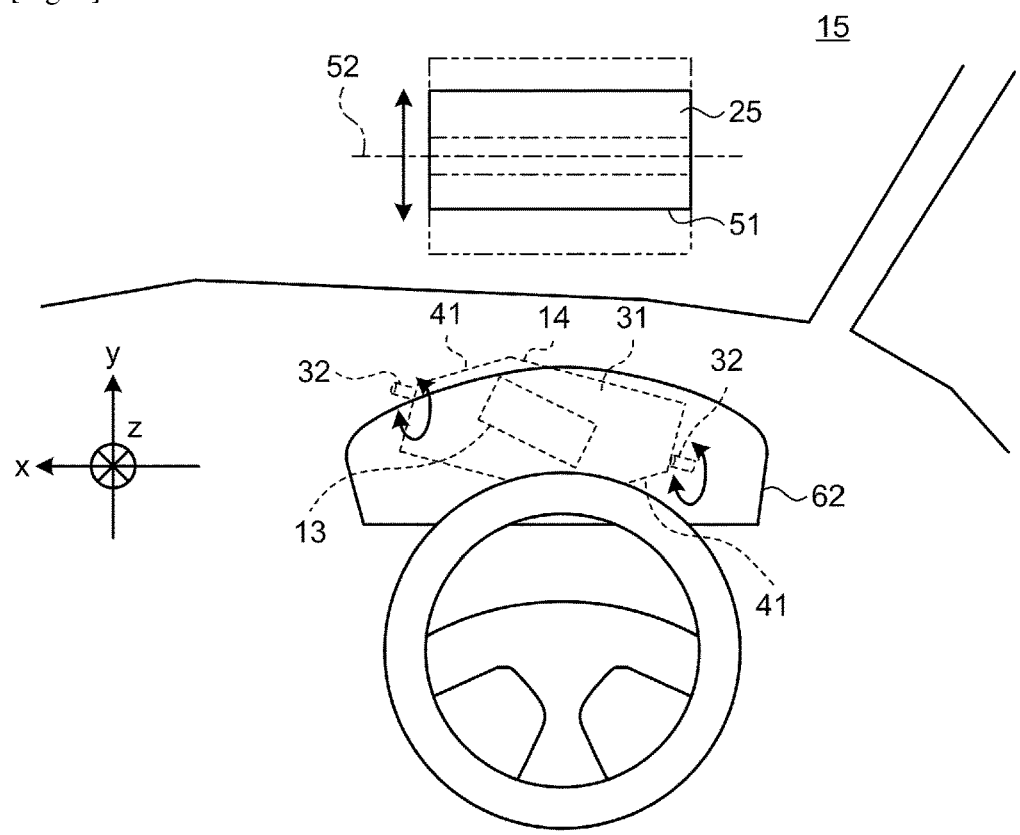
[Fig. 8]
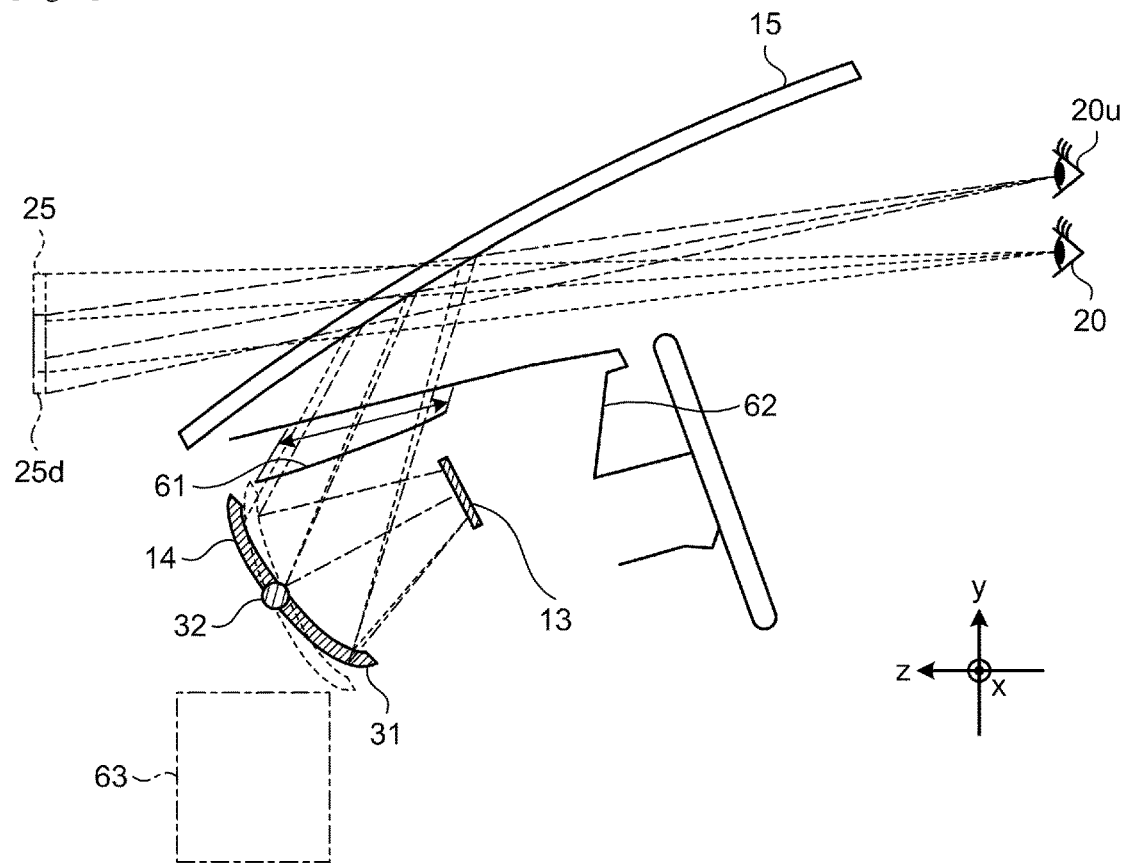

[Fig. 9]
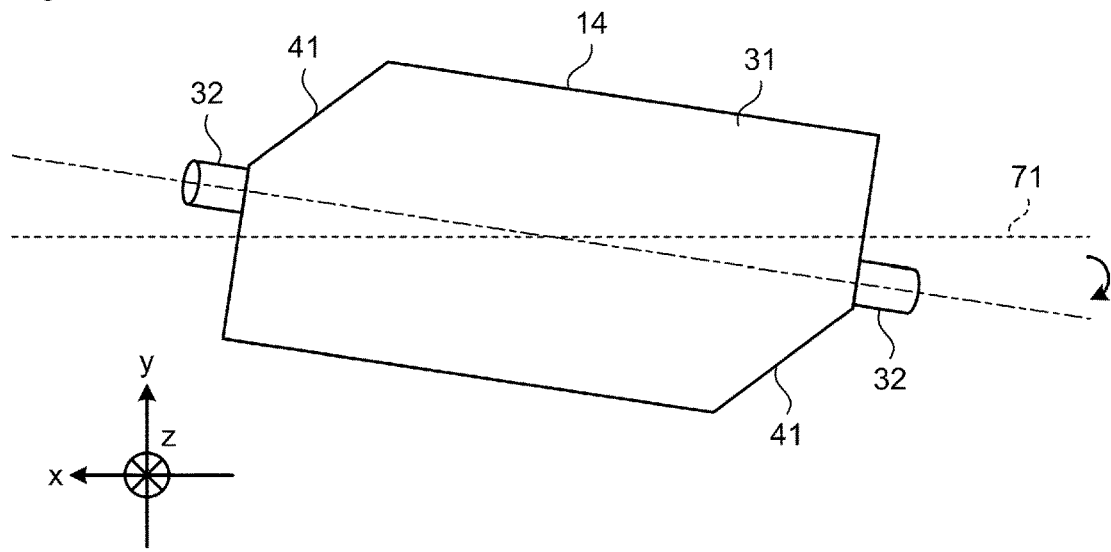
[Fig. 10]
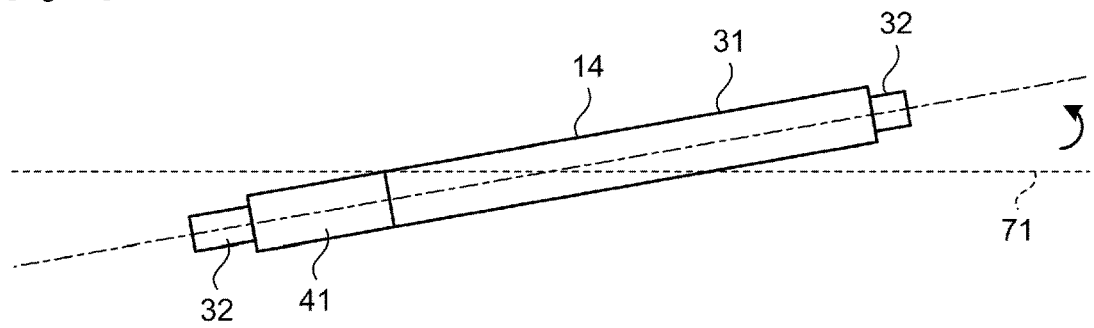
[Fig. 11]
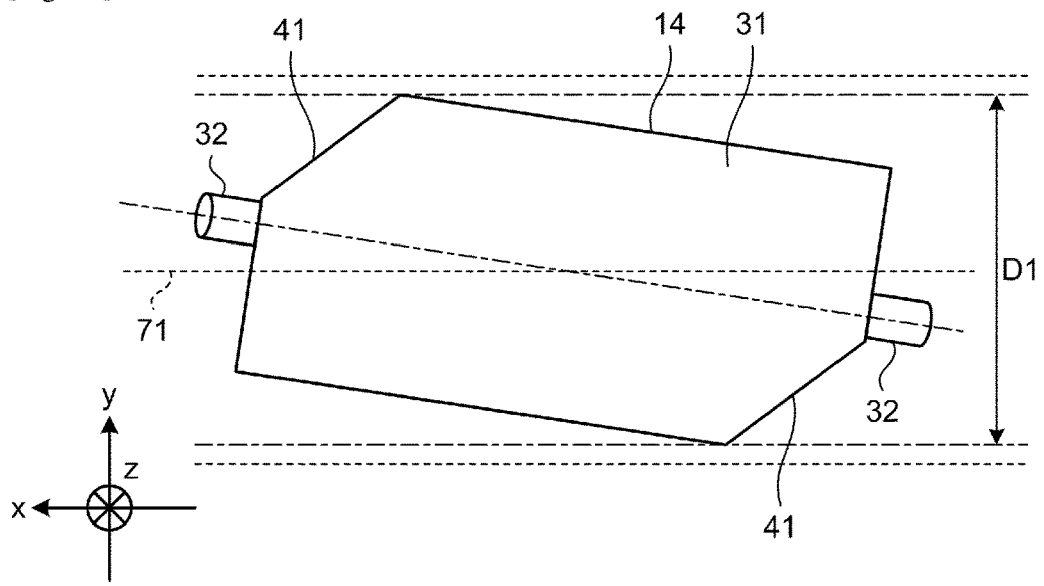

[Fig. 12]
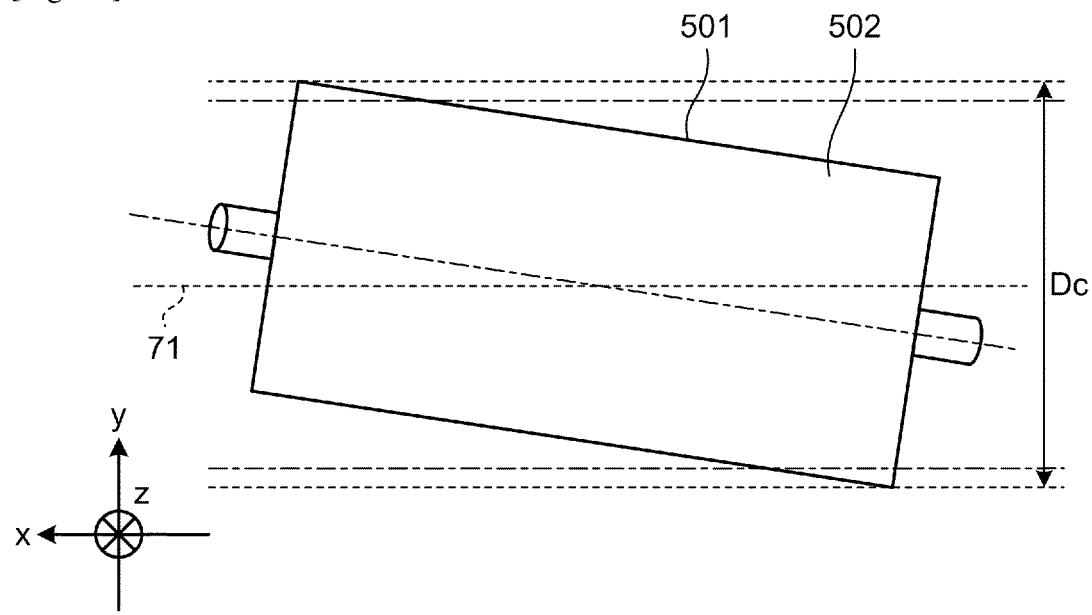
[Fig. 13]
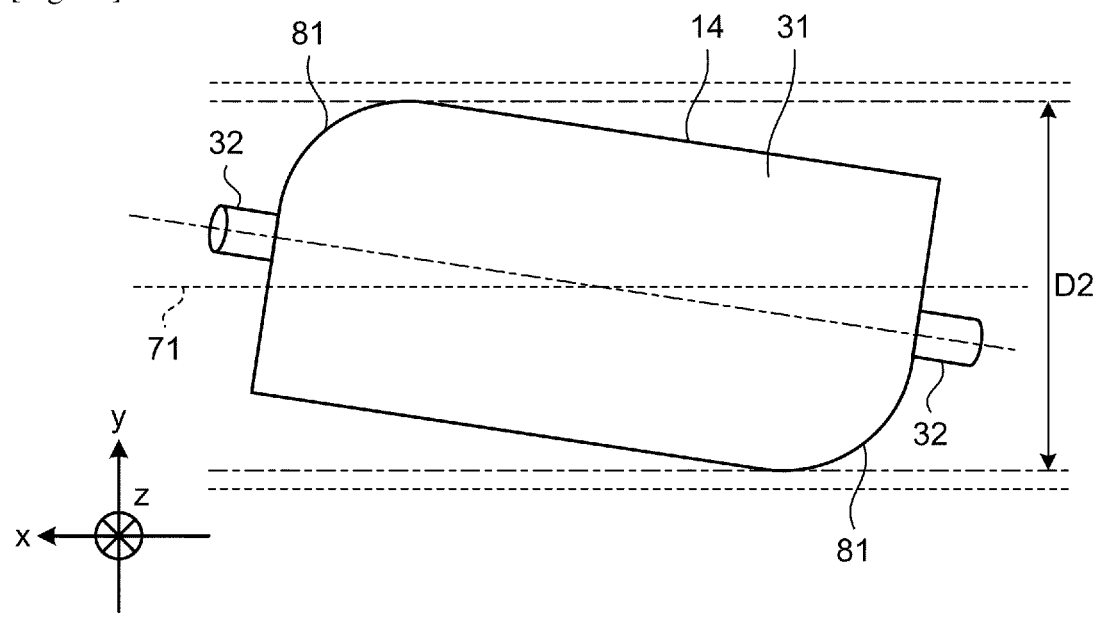

[Fig. 14]
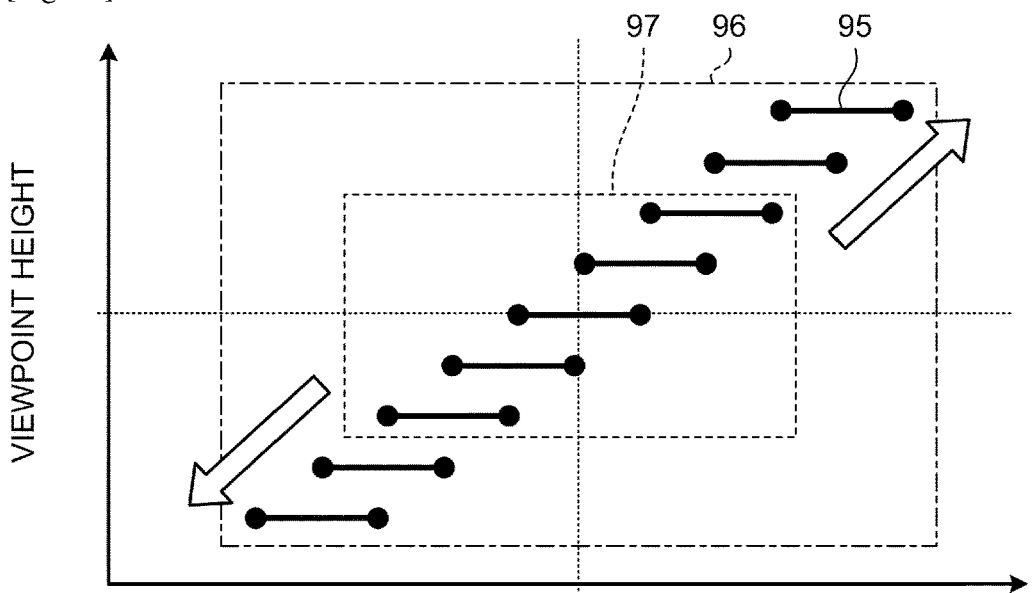
[Fig. 15]
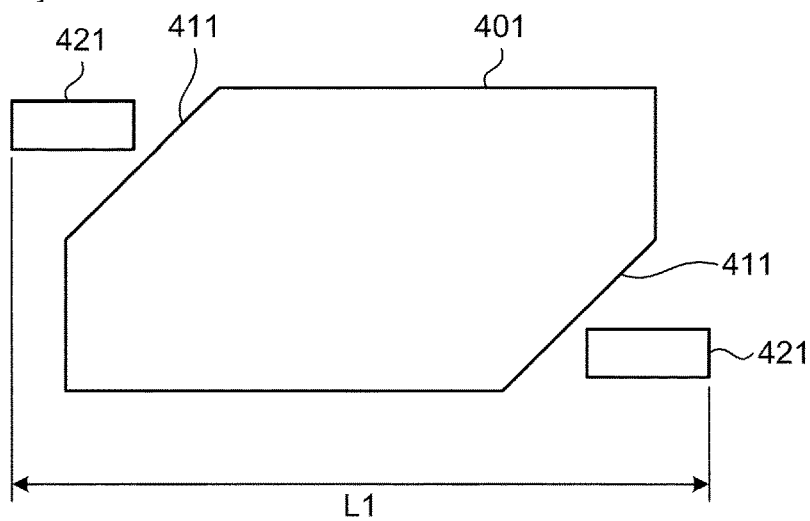
[Fig. 16]
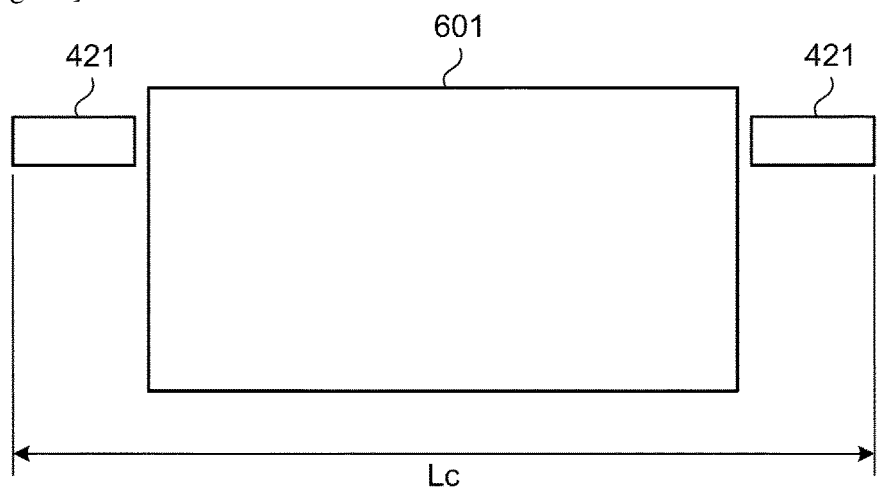

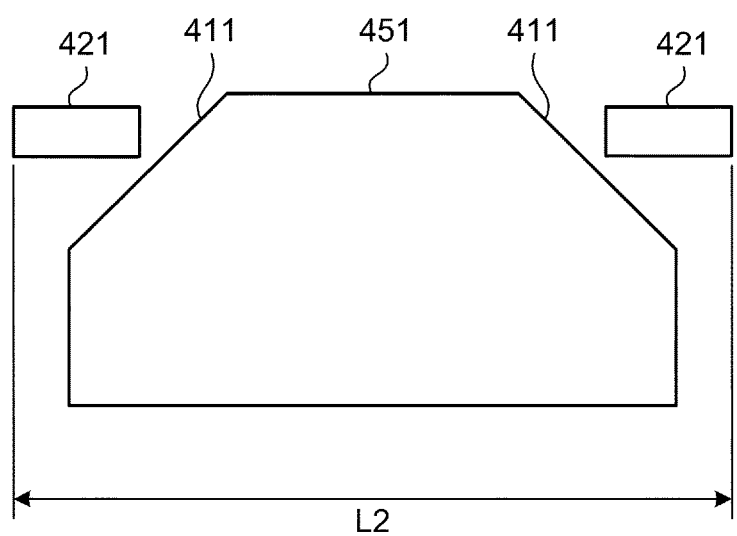
[Fig. 17]

DISPLAY APPARATUS AND EQUIPMENT

TECHNICAL FIELD

The present invention relates to a display apparatus and equipment.

BACKGROUND ART

Head up displays (HUDs) are used as applications that allow a driver (viewer) to recognize various types of information such as alarms and navigation information with a little movement of the driver's line of sight in a moving body such as a vehicle.

For example, a display apparatus is disclosed that includes an image forming unit forming an intermediate image by light and an optical system including a mirror guiding light having formed the intermediate image to a curved transmissive reflection member, and in which a virtual axis connecting the center of the intermediate image and the center of an incident light flux incident on the mirror is tilted with respect to all of the up-down direction, left-right direction, and front-rear direction of a moving body (PTL 1). The light having formed the intermediate image is guided to the transmissive reflection member by the mirror. The viewer can visually recognize a virtual image by light reflected by the transmissive reflection member.

SUMMARY OF INVENTION

Technical Problem

The virtual image displayed in a manner described above is required to be displaced in accordance with the viewer's view point (the viewer's eyes positions). For example, when the viewer changes the view point up and down, it is necessary to change the position of the virtual image up and down in accordance with the change in view point. The position of the virtual image can be changed by rotating the mirror reflecting light from the intermediate image in a pitch direction (a direction of rotation around an axis in the left-right direction of a moving body, for example,) so as to change the reflection direction of light, for example. In this case, capacity to adapt to a change in viewpoint depends on a rotatable range of the mirror.

The rotatable range of the mirror is, however, limited by other members (e.g., members included in a pedal mechanism, an air conditioning mechanism, a meter mechanism, and a steering mechanism in a vehicle) arranged on a periphery of the mirror. Those members make it not possible for the rotatable range of the mirror to be sufficiently achieved. As a result, the capacity to adapt to a change in viewpoint becomes insufficient in some cases.

In view of the above, the invention is made and aims to increase the rotatable range of the mirror and improve the capacity to adapt to a change in viewpoint.

Solution to Problem

According to an embodiment, provided is a display apparatus including: a screen configured to form an intermediate image by being irradiated with light; a reflection member configured to reflect light going out from the screen; and a rotation shaft configured to rotate the reflection member, wherein the rotation shaft is tilted with respect to a pitch axis, and the reflection member has a first notch.

Advantageous Effects of Invention

The invention can increase the rotatable range of the mirror and improve the capacity to adapt to a change in viewpoint.

BRIEF DESCRIPTION OF DRAWINGS

FIG. 1 is a schematic diagram exemplarily illustrating a structure of a display apparatus according to a first embodiment.

FIG. 2 is a block diagram illustrating a hardware structure of the display apparatus according to the first embodiment.

FIG. 3 is a block diagram exemplarily illustrating a functional structure of the display apparatus according to the first embodiment.

FIG. 4 is a schematic diagram exemplarily illustrating a specific structure of a light source according to the first embodiment.

FIG. 5 is a schematic diagram exemplarily illustrating a specific structure of a scanning mirror according to the first embodiment.

FIG. 6 is a schematic diagram exemplarily illustrating a specific structure of a screen according to the first embodiment.

FIG. 7 is a schematic diagram exemplarily illustrating constituting elements of the display apparatus according to the first embodiment when viewed from a viewer's position.

FIG. 8 is a schematic diagram exemplarily illustrating the constituting elements of the display apparatus according to the first embodiment when viewed from a side.

FIG. 9 is a schematic diagram exemplarily illustrating a concave mirror according to the first embodiment when viewed from a rear side of a car.

FIG. 10 is a schematic diagram exemplarily illustrating the concave mirror according to the first embodiment when viewed from an upper side of the car.

FIG. 11 is a schematic diagram exemplarily illustrating the concave mirror according to a first example of the first embodiment.

FIG. 12 is a schematic diagram exemplarily illustrating a concave mirror according to a comparative example.

FIG. 13 is a schematic diagram exemplarily illustrating the concave mirror according to a second example of the first embodiment.

FIG. 14 is a schematic diagram illustrating a relation between the height of a viewpoint and a looking down angle of a virtual image.

FIG. 15 is a schematic diagram exemplarily illustrating a structure of a screen and synchronization detection sensors according to a first example of a second embodiment.

FIG. 16 is a schematic diagram exemplarily illustrating a structure of a screen and the synchronization detection sensors according to a comparative example.

FIG. 17 is a schematic diagram exemplarily illustrating a structure of a screen and the synchronization detection sensors according to a second example of the second embodiment.

DESCRIPTION OF EMBODIMENTS

The following describes embodiments of a display apparatus and equipment in detail with reference to the accompanying drawings. The following embodiments do not limit the invention. The constituent elements in the following embodiments include those that can be easily envisaged by those skilled in the art, those that are substantially the same, and those that are in a range of what is called equivalents. Various omissions, substitutions, changes, and combinations of the constituent elements may be made without departing from the spirit of the following embodiments.

First Embodiment

FIG. 1 is a schematic diagram exemplarily illustrating a structure of a display apparatus 1 according to a first embodiment. The display apparatus 1 according to the embodiment is an HUD mounted on equipment. The equipment can be a moving body such as a vehicle, an airplane, or a ship, or a non-moving body such as a maneuvering simulation system or a home theater. The following describes the HUD mounted on a car as an example of the display apparatus 1.

The display apparatus 1 includes a light source 11, a scanning mirror 12, a screen 13, and a concave mirror 14.

A front windshield 15 is a transmissive reflection member that has a function (partial reflection function) to transmit a part of a light flux and reflect the other part of the light flux. The front windshield 15 functions as a semi-transmissive mirror that causes a viewer (driver) 10 to visually recognize a front scenery and a virtual image 25 providing certain information to the viewer 10. The virtual image 25 provides, to the viewer 10, vehicle information (e.g., a speed and a running distance), navigation information (e.g., a route guidance and traffic information), and alarm information (e.g., collision information), for example. The virtual image 25 may be displayed by being superimposed on the front scenery. A semi-transmissive mirror (combiner) may be used that serves as an individual transmissive reflection member having the same function (partial reflection function) as the front windshield 15.

The light source 11 emits laser light. The light source 11 may emit laser light obtained by combining laser light components of three colors of R, G, and B, for example. Laser light emitted from the light source 11 is guided to a reflection surface of the scanning mirror 12.

The scanning mirror 12 is a device that changes a traveling direction of laser light using micro electro mechanical systems (MEMS), for example. The scanning mirror 12 can be achieved using a single tiny mirror that oscillates with respect to two axes orthogonal to each other or a mirror system composed of two mirrors that oscillate or rotate with respect to a single axis.

Laser light going out from the scanning mirror 12 scans the screen 13, thereby forming an intermediate image, which is a two-dimensional image, on the screen 13. The screen 13 has a function to diverse laser light at a certain divergence angle. The screen 13 is formed using a microlens array, for example.

Laser light going out from the screen 13 is reflected by the concave mirror 14 to the front windshield 15. The concave mirror 14 is designed and disposed to correct image distortion caused by a curved shape of the front windshield 15. As a result, light having formed the intermediate image on the screen 13 is projected toward the front windshield 15, thereby allowing the viewer 10 to visually recognize the virtual image 25 by light reflected by the front windshield 15.

The concave mirror 14 includes a reflection member 31 and a rotation shaft 32. The reflection member 31, the cross-sectional surface of which has a concave shape, reflects light going out from the screen 13 to the front windshield 15. The rotation shaft 32 rotates the reflection member 31 in a substantially pitch direction. The pitch direction is a direction of rotation around a pitch axis. The pitch axis is represented as the X-axis in FIG. 1. The pitch axis can be set on the basis of various elements as references. The pitch axis can be a horizontal axis of a display region set as a region in which the virtual image 25 is displayed, or an axis in the left-right direction of the equipment (in the embodiment, the pitch axis of the car body), for example. Likewise, the Y-axis can be an axis in the up-down direction in the display region or an axis (yaw axis) in the up-down direction of the equipment while the Z-axis can be an axis in the front-rear direction in the display region or an axis (roll axis) in the front-rear direction of the equipment, for example. The rotation shaft 32 according to the embodiment is disposed by being tilted with respect to the exact pitch axis (X-axis). As a result, the reflection member 31 rotates in such a manner that the reflection member 31 is tilted with respect to the exact pitch direction. The reflection member 31 has notches 41 (first notch) formed thereon. The structure of the concave mirror 14 will be described in detail later.

FIG. 2 is a block diagram illustrating a hardware structure of the display apparatus 1 according to the first embodiment. The display apparatus 1 in this example includes a field programmable gate array (FPGA) 101, a central processing unit (CPU) 102, a read only memory (ROM) 103, a random access memory (RAM) 104, an interface (I/F) 105, a bus line 106, a laser diode (LD) 109, an LD driver 110, MEMS 111, a MEMS controller 112, a motor 113, and a motor driver 114.

The LD 109 is a semiconductor light emitting element included in a part of the light source 11. The LD driver 110 is a circuit that produces a driving signal to drive the LD 109. The MEMS 111, which are included in a part of the scanning mirror 12, are devices that displace the mirror. The MEMS controller 112 is a circuit that produces a driving signal to drive the MEMS 111. The motor 113 is an electric motor that rotates the rotation shaft 32 of the concave mirror 14. The motor driver 114 is a circuit that produces a driving signal to drive the motor 113. The FPGA 101 is an integrated circuit the setting of which can be changed by a designer of the display apparatus 1. The LD driver 110, the MEMS controller 112, and the motor driver 114 produce the respective driving signals in accordance with respective control signals from the FPGA 101. The CPU 102 is an integrated circuit that performs processing to control the whole of the display apparatus 1. The ROM 103 is a storage device that stores therein a program for controlling the CPU 102. The RAM 104 is a storage device that functions as a working area of the CPU 102. The I/F 105, which is an interface to communicate with external devices, is connected to a controller area network (CAN) of the car, for example.

FIG. 3 is a block diagram exemplarily illustrating a functional structure of the display apparatus 1 according to the first embodiment. The display apparatus 1 in this example includes a vehicle information input unit 201, an external information input unit 202, an image generation unit 203, and an image display unit 204. The vehicle information input unit 201 is a functional unit that acquires information (e.g., a speed and a running distance) about the car from the CAN, for example. The vehicle information input unit 201 is achieved by the I/F 105, the CPU 102, and programs stored in the ROM 103, for example. The external information input unit 202 is a functional unit that acquires, from an external network, external information (e.g., positional information from a GPS, route information from a navigation system, and traffic information) about the car. The external information input unit 202 is achieved by the I/F 105, the CPU 102, and programs stored in the ROM 103, for example. The image generation unit 203 is a functional unit that determines the structure of the virtual image 25 on the basis of the information acquired by the vehicle information input unit 201 and the external information input unit 202, and produces display information for displaying the virtual image 25. The image generation unit 203 is achieved by the I/F 105, the CPU 102, and programs stored in the ROM 103, for example. The image display unit 204 is a functional unit that displays the virtual image 25 on a certain screen (in the embodiment, on the front windshield 15) on the basis of the display information produced by the image generation unit 203. The image display unit 204 includes the CPU 102, the FPGA 101, the LD 109, the LD driver 110, the MEMS 111, the MEMS controller 112, the motor 113, and the motor driver 114, for example. The image display unit 204 includes a control unit 211. The control unit 211 is a functional unit that performs processing to adjust the position of the virtual image 25, and produces respective signals for controlling the FPGA 101, the LD driver 110, the MEMS controller 112, and the motor driver 114, for example.

FIG. 4 is a schematic diagram exemplarily illustrating a specific structure of the light source 11 according to the first embodiment. The light source 11 in this example includes light source elements 301R, 301G, and 301B, coupling lenses 302R, 302G, and 302B, apertures 303R, 303G, and 303B, combining elements 304, 305, and 306, and a lens 307. The light source elements 301R, 301G, and 301B for the three colors of R, G, and B, respectively, are LDs each having a single or multiple light emitting points. The light source elements 301R, 301G, and 301B emit light fluxes having wavelengths λR, λG, and λB, respectively, (e.g., λR=640 nm, λG=530 nm, and λB=445 nm) different from one another. The coupling lenses 302R, 302G, and 302B couple the respective corresponding emitted light fluxes. The apertures 303R, 303G, and 303B shape the respective corresponding coupled light fluxes. The apertures 303R, 303G, and 303B have a shape (e.g., a circular shape, an elliptical shape, a rectangular shape, or a square shape) corresponding to a certain condition such as the divergence angle of the light flux, for example. The combining elements 304, 305, and 306 combine the respective light fluxes shaped by the apertures 303R, 303G, and 303B. The combining elements 304, 305, and 306, each of which is a dichroic mirror having a plate shape or a prism shape and reflects or transmits a light flux in accordance with a wavelength, combine the respective light fluxes into a single light flux. The combined light flux passes through the lens 307 and is guided to the scanning mirror 12.

FIG. 5 is a schematic diagram exemplarily illustrating a specific structure of the scanning mirror 12 according to the first embodiment. The scanning mirror 12 in this example, which is a MEMS mirror manufactured by semiconductor processes, includes a mirror 351, serpentine beam units 352, a frame member 353, and piezoelectric members 354. The mirror 351 has a reflection surface that reflects laser light emitted from the light source 11 to the screen 13. The serpentine beam units 352 are formed, as a pair, with the mirror 351 interposed therebetween. The serpentine beam unit 352 has a plurality of folding units, each of which includes a first beam 352a and a second beam 352b arranged alternately. The serpentine beam units 352 are supported by the frame member 353. The piezoelectric members 354 are arranged such that the piezoelectric member 354 connects the first beam 352a and the second beam 352b adjacent to each other. The piezoelectric member 354 applies different voltages on the first beam 352a and the second beam 352b to cause the first beam 352a and the second beam 352b to be warped. As a result, the first beam 352a and the second beam 352b adjacent to each other are bent in different directions. Accumulated deflections cause the mirror 351 to rotate in the vertical direction around the axis in the left-right direction of the mirror 351. This structure makes it possible to achieve light scanning in the vertical direction with a low voltage. The light scanning in the horizontal direction around the axis in the up-down direction of the mirror 351 is achieved by resonance using a torsion bar connected to the mirror 351, for example.

FIG. 6 is a schematic diagram exemplarily illustrating a specific structure of the screen 13 according to the first embodiment. The screen 13 in this example has a microlens array structure in which a plurality of microlenses 371 each having a hexagonal shape are arranged without space therebetween. The screen 13 causes laser light emitted from the scanning mirror 12 to diverge at a certain divergence angle. The width (distance between facing two sides) of the microlens 371 can be approximately 200 μm. The microlenses 371 each having a hexagonal shape allow the multiple microlenses 371 to be arranged with high density. The shape of the microlens 371 is not limited to a hexagonal shape. For example, the shape may be a quadrangular shape or a triangular shape. In this example, the multiple microlenses 371 are arranged with regularity. The arrangement of the microlenses 371 is not limited to this example. For example, the multiple microlenses 371 are arranged irregularly to have different distances among the centers of the microlenses 371. When such an irregular arrangement is employed, the microlenses 371 have different shapes from one another.

FIG. 7 is a schematic diagram exemplarily illustrating constituting elements of the display apparatus 1 according to the first embodiment when viewed from the viewer 10's position. FIG. 8 is a schematic diagram exemplarily illustrating the constituting elements of the display apparatus 1 according to the first embodiment when viewed from a side. FIGS. 7 and 8 illustrate a state where light (forming the intermediate image) going out from the screen 13 is reflected by the concave mirror 14, passes through an opening 61 formed on the upper portion of a dashboard, and is emitted to the front windshield 15, resulting in the virtual image 25 being displayed on the front windshield 15. The position of the virtual image 25 is changed at least in the up-down direction in accordance with the rotation of the reflection member 31 of the concave mirror 14.

FIG. 7 illustrates a state where the rotation shaft 32 of the concave mirror 14 is tilted with respect to the pitch axis (X-axis) (FIG. 8 does not illustrate a state where the rotation shaft 32 is tilted because FIG. 8 illustrates a cross-sectional surface of the concave mirror 14). As illustrated in FIG. 7, the pitch axis in this example is in parallel with a horizontal axis 52 of a display region 51 in which the virtual image 25 is displayed. The setting method of the display region 51 is not particularly limited to any specific method. For example, the display region 51 can be set to a region preliminarily set as a visible region for the viewer 10.

FIG. 9 is a schematic diagram exemplarily illustrating the concave mirror 14 according to the first embodiment when viewed from the rear side of the car. FIG. 10 is a schematic diagram exemplarily illustrating the concave mirror 14 according to the first embodiment when viewed from the upper side of the car. As illustrated in FIGS. 9 and 10, the rotation shaft 32 of the concave mirror 32 is tilted with respect to a pitch axis (X-axis) 71. In FIGS. 9 and 10, the Y-axis corresponds to the yaw axis while the Z-axis corresponds to the roll axis. As illustrated in FIG. 9, the rotation shaft 32 is tilted with respect to the pitch axis 71 in a roll direction, that is, a direction of rotation around the roll axis (Z-axis). As illustrated in FIG. 10, the rotation shaft 32 is tilted with respect to the pitch axis 71 in a yaw direction, that is, a direction of rotation around the yaw axis (Y-axis). The rotation shaft 32 in this example is tilted with respect to all of the X-axis (the pitch axis 71), the Y-axis (yaw axis), and the Z-axis (roll axis). This is because the front windshield 15 is curved such that the front windshield 15 is tilted with respect to all of the X-axis, the Y-axis, and the Z-axis. The concave mirror 14 in this example is designed and disposed to correct distortion in the virtual image 25 caused by a curved shape of the front windshield 15.

As illustrated in FIG. 7, the screen 13 is tilted with respect to the X-axis (the pitch axis 71) in the same manner as the reflection member 31 of the concave mirror 14. As a result, the intermediate image projected on the reflection member 13 is tilted with respect to the intermediate image formed on the screen 13 in the same direction as the reflection member 31.

As illustrated in FIG. 8, the position of the virtual image 25 is required to be changed in accordance with the position of a viewpoint 20 of the viewer 10. If the position of the virtual image 25 is not changed despite the viewpoint 20 being changed, a problem may arise in that accuracy in superimposing the virtual image 25 on the scenery is reduced or lack of display information in some cases is caused, for example. For example, when the position of the viewpoint 20 is changed upward to the position of a viewpoint 20u, it is necessary to rotate the reflection member 31 so as to lower the position of the virtual image 25 to the position of a virtual image 25d. A displaceable amount of the virtual image 25, that is, capacity to adapt to a change in the viewpoint 20, depends on a rotatable range of the reflection member 31.

The screen 13 and the concave mirror 14 in this example are arranged on the far side of a meter set (instrument panel) 62 in the dashboard. Other members such as the opening 61 and a pedal mechanism 63 are arranged near the reflection member 31. The other members arranged near the reflection member 31 limit the rotatable range of the reflection member 31, thereby reducing the capacity to adapt to a change in the viewpoint 20. The reflection member 31 according to the embodiment has the notches 41 formed thereon and the notches 41 prevent the reflection member 31 from interfering with the other members when the reflection member is rotated.

FIG. 11 is a schematic diagram exemplarily illustrating the concave mirror 14 according to a first example of the first embodiment. FIG. 12 is a schematic diagram exemplarily illustrating a concave mirror 501 according to a comparative example. The reflection member 31 of the concave mirror 14 according to the first example has the notches 41 formed thereon. The shape of a reflection member 502 of the concave mirror 501 according to the comparative example is a rectangle, and corresponds to the shape of the reflection member 31 before the notches 41 are formed. The notches 41 according to the first example each have a shape that prevents the reflection member 31 from interfering with the other members when the reflection member 31 is rotated. The notches 41 according to the first example are formed such that a rotation diameter D1 of the reflection member 31 with respect to the pitch axis 71 serving as a reference is reduced from that before the notches 41 are formed. The notches 41 according to the first example are formed by straightly cutting corner portions of the reflection member 31 having a rectangular shape. In other words, at least one of the corner portions among the corner portions that are the farthest from the pitch axis 71 of the reflection member 31 is formed as the notch 41. The rotation diameter D1 according to the first example is smaller than a rotation diameter Dc according to the comparative example. The use of the concave mirror 14 thus structured allows the rotatable range of the concave mirror 14 to be increased, thereby making it possible to improve the capacity to adapt to a change in the viewpoint 20.

FIG. 13 is a schematic diagram exemplarily illustrating the concave mirror 14 according to a second example of the first embodiment. Notches 81 (first notch) formed on the reflection member 31 of the concave mirror 14 according to the second example are formed by cutting the corner portions of the reflection member 31 having a rectangular shape in a curved shape. A rotation diameter D2 of the concave mirror 14 according to the second example is smaller than the rotation diameter Dc of the concave mirror 501 according to the comparative example. The notches 81 formed in such a shape can also increase the rotatable range of the concave mirror 14.

FIG. 14 is a schematic diagram illustrating a relation between the height of the viewpoint 20 and a looking down angle of the virtual image. The looking down angle of the virtual image is an angle made between the horizontal line passing through a single point (e.g., center point) in the virtual image 25 and a line passing through the viewpoint 20 and the single point. An angle adjustable range 95 indicates a range in which the looking down angle of the virtual image is adjusted at an identical height of the viewpoint 20.

As illustrated in FIG. 14, as the height of the viewpoint 20 is increased, the looking down angle of the virtual image is increased while as the height of the viewpoint 20 is decreased, the looking down angle of the virtual image is decreased. The looking down angle of the virtual image can be changed by changing the angle of the reflection member 31 (by rotating the reflection member 31). As the rotatable range of the concave mirror 14 is decreased, the adjustable range of the looking down angle of the virtual image is decreased, thereby reducing the capacity to adapt to a change in height of the viewpoint 20.

The reflection member 31 according to the embodiment has the notches 41 (81) formed thereon as described above. As a result, the rotatable range of the concave mirror 14 is wider than the rotatable range in a case where the concave mirror 501 according to the comparative example is used. FIG. 14 illustrates a comparison between a capacity range 96 to adapt to a change in the looking down angle of the virtual image (height of the viewpoint) according to the embodiment and a capacity range 97 to adapt to a change in the looking down angle of the virtual image (height of the viewpoint) according to the comparative example. As illustrated in FIG. 14, the capacity range 96 when the concave mirror 14 according to the embodiment is used is larger than the capacity range 97 when the concave mirror 501 according to the comparative example is used.

As described above, the embodiment can increase the rotatable range of the concave mirror 14 and improve the capacity to adapt to a change in the viewpoint 20.

Second Embodiment

FIG. 15 is a schematic diagram exemplarily illustrating a structures of a screen 401 and synchronization detection sensors 421 according to a first example of a second embodiment. The screen 401 in this example is a member that forms the intermediate image as a result of being scanned with laser light by the scanning mirror 12 in the same manner as the screen 13 according to the first embodiment.

The screen 401 in this example has notches 411 (second notch) formed thereon. The synchronization detection sensors 421 are arranged at positions where the notches 411 are formed. The synchronization detection sensor 421 is a device that detects laser light emitted from the scanning mirror 12. The synchronization detection sensor 421 is a photoelectric conversion element, for example. Scanning timing of laser light is determined on the basis of the detection results of the synchronization detection sensors 421, thereby making it possible to check the movement of the scanning mirror 12, for example.

The synchronization detection sensors 421 arranged at the positions where the notches 411 are formed can reduce a scanning range L1 of laser light. FIG. 16 is a schematic diagram exemplarily illustrating a structure of a screen 601 and the synchronization detection sensors 421 according to a comparative example. The shape of the screen 601 according to the comparative example is a rectangle, and corresponds to the shape of the screen 401 according to the first example illustrated in FIG. 15 in a case where the notches 411 are not formed. The synchronization detection sensors 421 according to the comparative example are arranged outside the screen 601 having a rectangular shape. A laser light scanning range Lc according to the comparative example is larger than the scanning range L1 according to the first example illustrated in FIG. 15.

The synchronization detection sensors 421 arranged at the positions where the notches 411 are formed on the screen 401 can reduce the laser light scanning range L1. The reduction of the scanning range L1 can achieve downsizing and cost reduction of the screen 401 and reduction of time taken to form the intermediate image, for example. The increase in the scanning range L1 causes the reduction in brightness of the virtual image 25. The reduction of the scanning range L1, thus, can improve quality of the virtual image 25.

The positions where the notches 411 are formed (positions where the synchronization detection sensors 421 are arranged) are preferably positions corresponding to regions where an image is rarely displayed on the screen 401 before the notches 411 are formed. This arrangement can prevent quality of the virtual image 25 from deteriorating. The positions where the notches 411 are formed preferably correspond to the positions where the notches 41 (81) are formed on the reflection member 31 of the concave mirror 14. The area of the screen 401 is reduced in accordance with the reduction in area of the reflection member 31 due to the notches 41, thereby making it possible to downsize the screen 401 by removing unnecessary portions.

FIG. 17 is a schematic diagram exemplarily illustrating a structure of a screen 451 and the synchronization detection sensors 421 according to a second example of the second embodiment. The positions where the notches 411 of the screen 401 according to the first example illustrated in FIG. 15 are formed correspond to the positions where the notches 41 of the concave mirror 14 illustrated in FIG. 11, for example, are formed. The positions where the notches 411 of the screen 451 according to the second example illustrated in FIG. 17 are formed do not correspond to the positions where the notches 41 of the concave mirror 14 are formed. The structure can also further reduce a scanning range L2 than the scanning range Lc according to the comparative example, thereby making it possible to obtain the same effect as the first example.

As described above, the embodiment can achieve the downsizing of the apparatus, cost reduction of the apparatus, and quality improvement in addition to the improvement of the capacity to adapt to a change in the viewpoint 20.

While the embodiments of the invention have been described, the embodiments have been presented by way of examples only, and are not intended to limit the scope of the invention. The novel embodiments described herein may be embodied in a variety of other forms. Furthermore, various omissions, substitutions, changes, and combinations of the embodiments described herein may be made without departing from the spirit of the invention. The accompanying claims and their equivalents are intended to cover the embodiments and modifications as would fall within the scope and spirit of the invention.

REFERENCE SIGNS LIST

1 Display apparatus
10 Viewer
11 Light source
12 Scanning mirror
13, 401, 451, 601 Screen
14, 501 Concave mirror
20, 20u Viewpoint
25, 25d Virtual image
31, 502 Reflection member
32 Rotation shaft
41, 81 Notch (first notch)
51 Display region
52 Horizontal axis
61 Opening
62 Meter set
63 Pedal mechanism
71 Pitch axis
95 Angle adjustment range
96, 97 Capacity range
101 FPGA
102 CPU
103 ROM
104 RAM
105 I/F
106 Bus line
109 LD
110 LD driver
111 MEMS
112 MEMS controller
113 Motor
114 Motor driver
201 Vehicle information input unit
202 External information input unit
203 Image generation unit
204 Image display unit
211 Control unit
301R, 301G, 301B Light source element
302R, 302G, 302B Coupling lens
303R, 303G, 303B Aperture
304, 305, 306 Combining element
307 Lens
351 Mirror
352 Serpentine beam unit
352a First beam
352b Second beam
353 Frame member
354 Piezoelectric member
371 Microlens
411 Notch (second notch)

421 Synchronization detection sensor
D1, D2, Dc Rotation diameter
L1, L2, Lc Scanning range

CITATION LIST

Patent Literature

PTL 1: Japanese Laid-open Patent Publication No. 2015-232692

The invention claimed is:

1. A display apparatus, comprising:
   a screen configured to form an intermediate image by being irradiated with light;
   a reflection member configured to reflect light going out from the screen; and
   a rotation shaft configured to rotate the reflection member, wherein
   the rotation shaft is tilted with respect to a pitch axis, and
   the reflection member has a first notch formed to change a shape of the reflection member viewed in a direction perpendicular to a reflection surface of the reflection member.

2. The display apparatus according to claim 1, wherein the first notch has a shape that prevents the reflection member from interfering with any member other than the reflection member when the reflection member is rotated.

3. The display apparatus according to claim 1, wherein the first notch is formed such that a rotation diameter of the reflection member with respect to the pitch axis serving as a reference is reduced from the rotation diameter without the first notch being formed.

4. The display apparatus according to claim 1, wherein the first notch is formed by cutting a corner portion of the reflection member having a rectangular shape.

5. The display apparatus according to claim 1, wherein the first notch is formed on the reflection member at a position farthest from the pitch axis.

6. The display apparatus according to claim 1, wherein the pitch axis is parallel with a horizontal axis of a display region where a virtual image is displayed.

7. The display apparatus according to claim 1, wherein the pitch axis is a pitch axis of equipment on which the display apparatus is mounted.

8. The display apparatus according to claim 1, wherein the rotation shaft is tilted with respect to the pitch axis in a roll direction.

9. The display apparatus according to claim 1, wherein the rotation shaft is tilted with respect to the pitch axis in a yaw direction.

10. The display apparatus according to claim 1, wherein the intermediate image projected on the reflection member is tilted with respect to the intermediate image formed on the screen in a same direction as the reflection member.

11. The display apparatus according to claim 1, wherein the screen has a second notch.

12. The display apparatus according to claim 11, wherein the second notch is formed at a position corresponding to a position where the first notch is formed.

13. The display apparatus according to claim 11, wherein
    the intermediate image is formed as a result of the screen being scanned with laser light, and
    at a position adjacent to where the second notch is formed, a sensor detecting the laser light is disposed.

14. An equipment, comprising:
    the display apparatus according to claim 1; and
    a transmissive reflection member configured to form a virtual image by being irradiated with the light forming the intermediate image.

15. The equipment according to claim 14, wherein
    the transmissive reflection member is curved, and
    the rotation shaft is tilted by following a curved shape of the transmissive reflection member.

16. A display apparatus, comprising:
    a screen configured to form an intermediate image by being irradiated with light;
    a reflection member configured to reflect light going out from the screen; and
    a rotation shaft configured to rotate the reflection member, wherein
    the rotation shaft is tilted with respect to a pitch axis,
    the reflection member has a first notch, and
    the first notch is formed such that a rotation diameter of the reflection member with respect to the pitch axis serving as a reference is reduced from the rotation diameter without the first notch being formed.

17. A display apparatus, comprising:
    a screen configured to form an intermediate image by being irradiated with light;
    a reflection member configured to reflect light going out from the screen; and
    a rotation shaft configured to rotate the reflection member, wherein
    the rotation shaft is tilted with respect to a pitch axis,
    the reflection member has a first notch, and
    the first notch is formed by cutting a corner portion of the reflection member having a rectangular shape.

* * * * *